United States Patent [19]

Dykstra

[11] Patent Number: 5,121,540

[45] Date of Patent: Jun. 16, 1992

[54] PLATING APPARATUS FOR CONSTRUCTING OR REPAIRING A PALLET

[75] Inventor: Gerald L. Dykstra, Wyoming, Mich.

[73] Assignee: Industrial Resources of Michigan, Grand Rapids, Mich.

[21] Appl. No.: 587,391

[22] Filed: Sep. 25, 1990

[51] Int. Cl.[5] .............................................. B23P 21/00
[52] U.S. Cl. ........................................ 29/772; 29/799; 29/897.1; 227/152; 269/910
[58] Field of Search ................ 29/252, 257–262, 29/281.3, 521, 525.2, 243.53, 772, 787, 795, 798, 897.1, 897.3, 89.31, 897.312, 799; 269/155, 156, 910; 227/153, 152

[56] References Cited

U.S. PATENT DOCUMENTS

| | | | |
|---|---|---|---|
| 3,068,484 | 12/1962 | Moehlenpah et al. | 227/152 |
| 3,069,684 | 12/1962 | Moehlenpah et al. | 227/152 X |
| 3,315,595 | 4/1967 | Moehlenpah et al. | 227/152 X |
| 3,823,861 | 7/1974 | Jureit et al. | 227/153 |
| 3,837,557 | 9/1974 | Jureit et al. | 227/152 |
| 3,866,530 | 2/1975 | Moehlenpah | 269/910 X |
| 3,941,291 | 3/1976 | Hayworth | 227/152 |
| 3,968,560 | 7/1976 | Vial | 29/772 X |
| 4,235,005 | 11/1980 | James | 29/281.1 |
| 4,262,588 | 4/1981 | McDonald | 100/234 |
| 4,295,591 | 10/1981 | Lundstrom | 227/142 |
| 4,365,734 | 12/1982 | Harris | 227/152 |
| 4,398,706 | 8/1983 | Kawlfuss | 29/261 X |
| 4,572,420 | 2/1986 | Pistorius | 227/110 |
| 4,627,564 | 12/1986 | Bowser | 269/910 X |
| 4,655,443 | 4/1987 | Weeks | 269/156 |
| 4,657,168 | 4/1987 | Matlock | 227/152 |
| 4,688,712 | 8/1987 | Wolf | 227/152 |
| 4,845,825 | 7/1989 | Gleason | 29/252 |

FOREIGN PATENT DOCUMENTS 154017 of 1963 U.S.S.R. .............................. 29/772

OTHER PUBLICATIONS

Clary pallet plater, on sale more than one year before Sep. 1990.

Primary Examiner—Joseph M. Gorski
Assistant Examiner—Peter D. Vo
Attorney, Agent, or Firm—Price, Heneveld, Cooper, DeWitt & Litton

[57] ABSTRACT

The invention is embodied in a plating apparatus having a pivotally mounted unitary c-shaped plating member including opposing arms joined at a bight portion. Pressing means extend between the opposing arms to force a splice-plate and a portion of a pallet towards each other. The pressing means includes a hydraulic cylinder powered by a two-stage pump that provides low-pressure, high flow during an initial run-out of the cylinder and high-pressure during actual impaling of the splice-plate into the pallet stringer. The pivot for the c-shaped member preferably extends from the center of gravity of the member to minimize unbalanced weight stressing the pivot pin. A holddown means is provided for holding a pallet against a pallet support member. The holddown means is likewise pivotally mounted.

28 Claims, 2 Drawing Sheets

PLATING APPARATUS FOR CONSTRUCTING OR REPAIRING A PALLET

BACKGROUND OF THE INVENTION

This invention relates generally to an apparatus for applying splice-plates to join two structural members. More particularly, the invention relates to the repair of fractured boards in a pallet and is especially adapted to repairing fractures in pallet stringers.

When a pallet stringer, or elongated member separating the deck boards, becomes fractured, the traditional approach to repairing the pallet is to remove the damaged stringer using known apparatus, such as that disclosed in my U.S. Pat. No. 4,945,626 for a SINGLE-PASS PALLET DISASSEMBLER WITH SELF-ADJUSTING HEAD, and substitute an undamaged stringer. Another approach is to utilize splice-plates that have received wide acceptance in the manufacture of roof trusses and the like, at the location of the fracture to salvage the pallet without the necessity of removing the stringer. An apparatus directed to accomplishing the repair of a pallet stringer utilizing splice-plates is disclosed in U.S. Pat. No. 4,845,825 issued to Gleason for an APPARATUS FOR REPAIRING PALLETS (hereinafter Gleason patent). The apparatus disclosed in the Gleason patent utilizes an extendable cylinder to pivot a pair of arms about a central pivot point in a scissor-like movement in order to force two clamping members, to which nail-plates are magnetically retained together. By straddling the fractured stringer with the clamping members and by extending the extendable cylinder, force is applied to impale the splice-plates into opposite surfaces of the stringer.

One difficulty with the apparatus disclosed in the Gleason patent is that a fractured stringer is often separated at the fracture. By not bringing the members together at the fracture, the repaired stringer is not much stronger than the stringer before the repair. Another difficulty is that the pivotal interconnection of plating arms in the apparatus disclosed in the Gleason patent, has additionally proved to be a source of stress-induced failure in such an apparatus. Additionally, the scissor-like action requires that the clamping plates be pivotally mounted, which provides yet another failure point.

Accordingly, it is an object of the present invention to provide a pallet plating apparatus that avoids the drawbacks experienced in the prior art in a unique manner for the purpose of providing a superior fracture repair with minimal stress applied to the apparatus.

SUMMARY OF THE INVENTION

The invention is embodied in a plating apparatus having a pivotally mounted unitary c-shaped plating member including opposing arms joined at a bight portion. Pressing means extend between the opposing arms to force a splice-plate and a portion of a pallet towards each other. The pressing means includes a hydraulic cylinder powered by a two-stage pump that provides low-pressure, high flow during an initial run-out of the cylinder and high-pressure during actual impaling of the splice-plate into the pallet stringer. The pivot for the c-shaped member preferably extends from the center of gravity of the member to minimize unbalanced weight stressing the pivot pin. A holddown means is provided for holding a pallet against a pallet support member. The holddown means is likewise pivotally mounted. In this manner, as the pressing means forces the splice-plate or splice-plates into the pallet any "squirming" by the stringer is accommodated by the pivoting movement of the holddown means. In a preferred embodiment, the pivot axis of the holddown means is coaxial with the pivot axis of the plating member.

The plating member is supported by a first mounting means for mounting the plating member to the pallet support. Second mounting means are provided for mounting the holddown means to the pallet support member independently of the first mounting means. In this manner, the rotational forces applied to the mounting means of the holddown, as a result of the holddown force, is translated directly to the pallet support member rather than to the plating member and the support for the plating member. Accordingly, the rotational forces inducing stress on the support for the plating member is achieved.

These and other objects, advantages and features of this invention will become apparent upon review of the following specification in conjunction with the drawings.

DESCRIPTION OF THE PREFERRED EMBODIMENT

Figure 1:
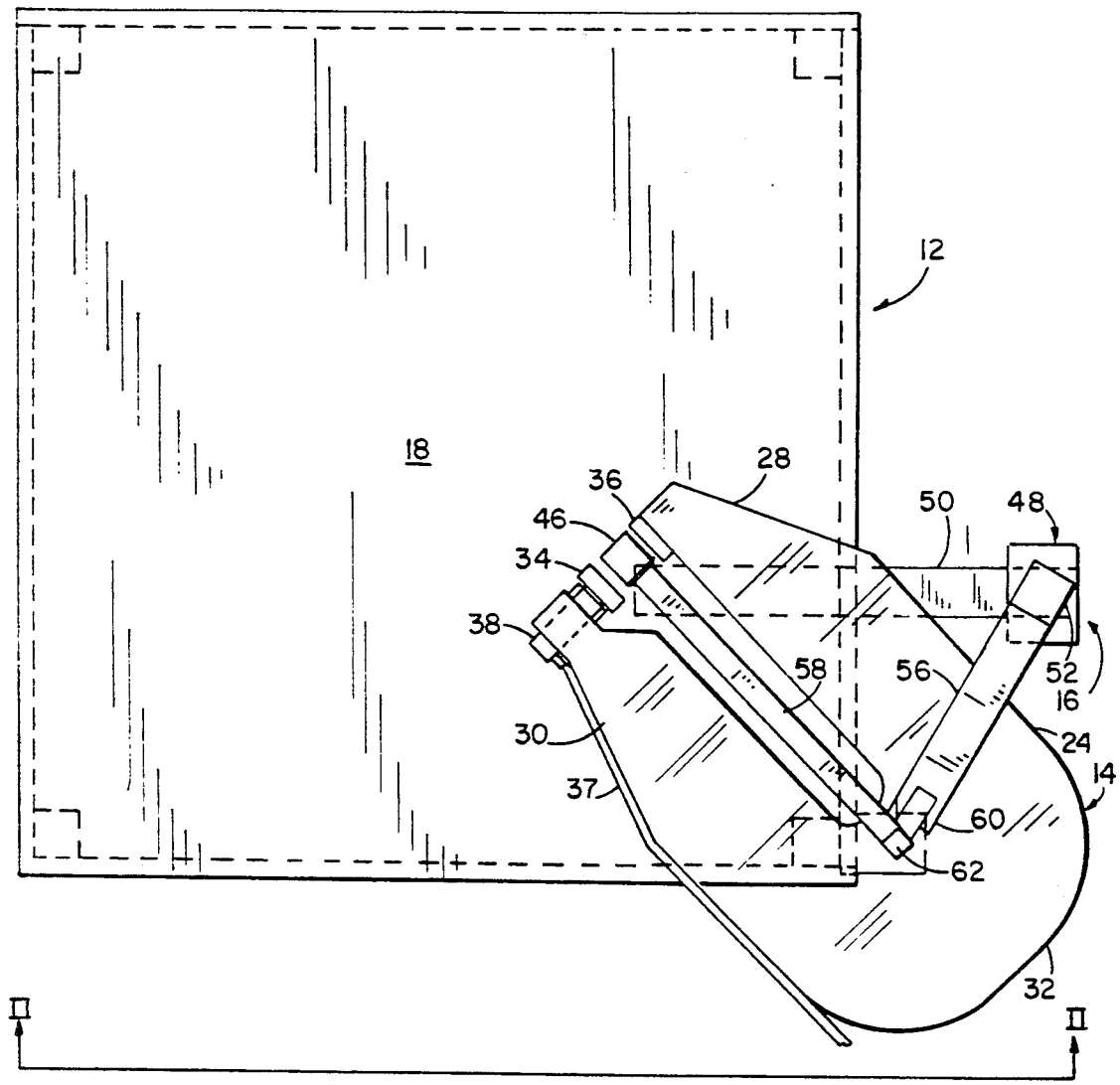
FIG. 1 is a top elevation of a pallet plating apparatus embodying the invention.
Figure 2:
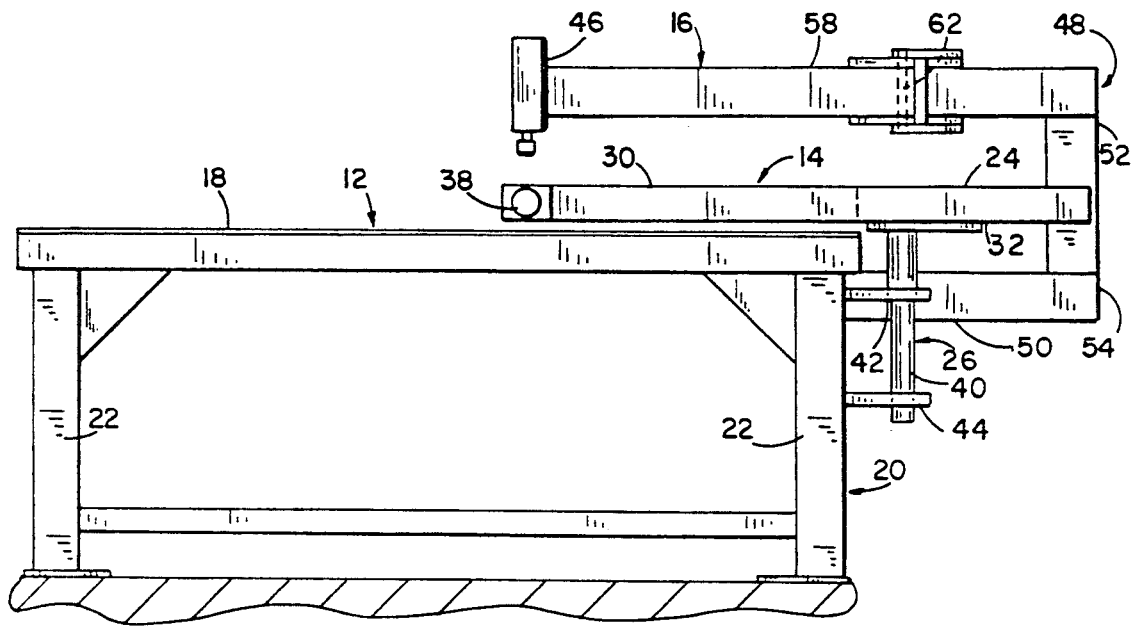
FIG. 2 is a side elevation taken along the lines II—II of FIG. 1.
Figure 3:
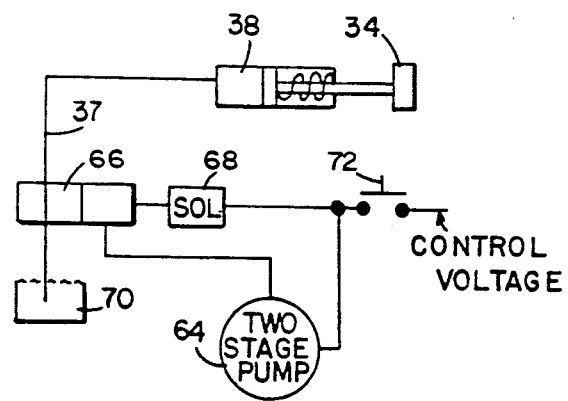
FIG. 3 is a combined electrical and hydraulic schematic diagram of a pallet plating apparatus.

Referring now specifically to the drawings, and the illustrative embodiments depicted therein, a pallet plating apparatus, generally illustrated at 10, includes a pallet support member 12, for supporting a pallet during a repair procedure, a plating member 14, for applying nailing plates on opposite sides of a stringer over a fracture, and a holddown member 16 for closing a fracture during the repair thereof.

Pallet support member 12 includes a horizontal surface defined by horizontal plate 18 and a support base 20 for supporting plate 18. Support base 20 includes square tubular legs 22 and appropriate bracing between the legs and plate 18. Plating member 14 includes a unitary c-shaped member 24, which is pivotally mounted to support member 12 by pivot means generally shown at 26. C-shaped member 24 includes first and second opposing arms 28, 30 which are joined together at a bight portion 32. A pair of clamping plates 34, 36 are located, respectively, at the end of arms 30, 28 opposite bight portion 32. Plate 36 is mounted directly to arm 28 while plate 34 is mounted to a hydraulic cylinder 38, which is mounted to arm 30. Plates 34, 36 are magnetized, in one of several manners that are well known in the art, such as by the inclusion of magnets (not shown), in order to hold splice-plates to plates 34, 36.

Pivot means 26 includes a pin 40 which is fixedly attached to c-shaped member 24 at the center of gravity of member 24. First and second bearings 42, 44, which are vertically spaced apart, rotatably support pin 40 therein. In this manner, c-shaped member 24 is free to pivot about a vertical axis defined by pin 40 while placing minimal stress on pin 40 because of the balanced mounting of member 24 at its center of gravity.

Holddown member 16 includes a pneumatic cylinder 46 which is vertically oriented above the center line extending between plates 34 and 36. Cylinder 46 is mounted to pallet support member 12 by support means, generally shown at 48, which supports cylinder 46 independent of pivot means 26 which supports c-shaped member 24. Support means 48 includes a first horizontal member 50 attached to support base 20 and a vertical member 52 extending upwardly from outer end 54 of horizontal member 50. A second horizontal member 56 extends from vertical member 52 to an end 60 that is positioned directly over the axis defined by pivot means 26. A third horizontal member 58 is pivotally mounted to end 60 of second horizontal member 56 by pivot means 62. Pneumatic cylinder 46 is mounted to an end of horizontal member 58 opposite that connected with pivot means 62. In this manner, pneumatic cylinder 46 is supported independently of c-shaped member 24. However, it is free to move in an arc about the same axis about which c-shaped member 24 is free to rotate. Accordingly, forces placed upon support means 48 by the downward thrust supplied by pneumatic cylinder 46 are translated directed to the pallet support member 12 and not to the plating member 14. This further reduces any stress on pivot means 26 which not only reduces wear and tear on apparatus 10, but additionally allows the plating member 14 to more freely pivot about pivot means 26.

Pallet plating apparatus 10 is preferably used with a 96 slice-plate which is double the conventional number of spikes, in order to provide a more secure repair. However, this requires the application of significantly greater insertion force than conventional pallet platers. In order to meet this requirement, hydraulic fluid is supplied to hydraulic cylinder 38 from a two stage pump 64. A three-way valve 66 that is electrically actuated by solenoid 68 interconnects hydraulic line 37, leading to cylinder 38, with either pump 64 or a hydraulic fluid reservoir 70. A single, user-operable switch 72, controls both solenoid 68 and pump 64. Accordingly, when a user actuates switch 72, solenoid 68 causes valve 66 to interconnect pump 64 with cylinder 38. This also energizes pump 64, which applies low pressure high volume fluid to cylinder 38 to cause it to run-out until clamping plates 34, 36 meet resistance The resistance causes an increase in hydraulic pressure which is sensed by an internal spool valve in pump 64 and, in turn, switches pump 64 into a high pressure, low-volume mode for final insertion of the splice-plates into the pallet stringer. When the repair is complete, the user releases switch 72 which de-energizes pump 64 and causes solenoid 68 to switch valve 66 to interconnect line 37 with reservoir 70. This results in a very rapid release of fluid from cylinder 38 and return of cylinder 38 to a non-extended condition.

The use of such two-stage pump allows cylinder 38 to provide a much greater force for a given cylinder size. The reduction in cylinder size allows the ends of arm 28, 30 to be inserted into the interior of a pallet with ease. Furthermore, the particular control arrangement, which discharges hydraulic fluid from cylinder 38 directly back to reservoir 70, increases cycle speed. Pump 64 is commercially available and is marketed by Ottawanda Tool Company (OTC) under Model No. PQ603. The low pressure mode of this pump provides hydraulic fluid at 100 psi at 730 cubic inches per minute. The high pressure mode is 10,000 psi at 60 cubic inches per minute. Valve 66 is marketed by OTC under Model No. 3610.

Pneumatic cylinder 46, used with the holddown member 16, is supplied with compressed air from a typical factory-piped supply source. C-shaped member in the illustrated embodiment is manufactured from a unitary plate of three inch thick A-36 steel. Horizontal members 50, 56 and 58 and vertical member 52 which make up support means 48 for holddown member 16 are manufactured from four inch steel tubing. Bearings 42, 44 are bronze bearings and pivot 62 is a steel pin in a bronze bearing.

In use, splice-plates (not shown) are positioned on each plate 34, 36 and held there by magnetic force. A pallet is supported on support member 12 and the fractured portion of the stringer is inserted between plates 34 and 36 while plating member 14 is pivoted about pivot means 26 in order to find a desirable arrangement on support member 12 that provides proper support of the pallet. Pneumatic cylinder 46 is positioned over the fractured stringer by rotation of horizontal member 58 about pivot 62. Compressed air is applied to cylinder 46 by control means (not shown) in order to clamp the pallet against support plate 18. This forces the stringer portions adjacent the fracture together in order to produce a more mechanically rigid bond. Because the holddown member is located above the axis between the clamping plates 34, 36, it will be properly positioned above the fracture, which the operator positions between plates 34 and 36. Hydraulic fluid is then applied to cylinder 38 by actuating switch 72 in order to force clamping plate 34 in the direction of clamping plate 36. As this occurs, the splice-plates supported by clamping plates 34 and 36 are forced into opposite surfaces of the stringer. The c-shaped member 24 is free to pivot about pivot means 26 in order to assure even insertion force from plates 34 and 36. Any "squirming" induced in the stringer by the force exerted by clamping plates 34 and 36 is accommodated in support means 48 of holddown member 16 through horizontal member 58 pivoting about pivot means 62.

Changes and modifications in the specifically described embodiments can be carried out without departing from the principles of the invention. For example, although apparatus 10 is illustrated for use in repairing pallets, it may additionally find application in pallet manufacture. For example, splice-plates may be applied to stringer end-portions to provide durability. Furthermore, apparatus 10 may be used with pallets made of materials other than wood, such as composites. The protection afforded the invention is intended to be limited only by the scope of the appended claims as interpreted to the principles of patent law including the Doctrine of Equivalents.

The embodiments of the invention in which an exclusive property or privilege is claimed are defined as follows:

1. A plating apparatus for constructing or repairing a pallet having stringers and deckboards defining an enclosed space comprising:
   a unitary c-shaped member having opposing arms extending in a generally horizontal plane and joined at a bight portion, aid opposing arms being constructed to matably fit about a stringer between the deckboards;
   a vertical axis pivot extending to said c-shaped member in order to pivotally mount said c-shaped member for rotation in said horizontal plane;

pressing means extending between said arms for forcing at least one splice-plate and a portion of a pallet toward each other; and holddown means for holding the pallet, said holddown means being movably mounted in a horizontal plane and adapted to exert a vertical force superjacent said pressing means.

2. The apparatus in claim 1 wherein said pivot extends to the center of gravity of said c-shaped member.

3. The apparatus in claim 1 further including support means for supporting a pallet below said c-shaped member and wherein said holddown means is adapted to force a portion of a pallet against said support means.

4. The apparatus in claim 1 wherein said pressing means includes a hydraulic cylinder actuated by a hydraulic pump having two modes of operation, one of said modes being low pressure and high volume and one of said modes being high pressure.

5. A plating apparatus for constructing or repairing a pallet having stringers and deckboards defining an enclosed space comprising:

a pallet support member having a horizontal support surface adapted to support a pallet;

plating means including a frame and means for pivotally mounting said frame about a given axis, wherein said frame includes opposing clamping portions, extendable means for forcing said clamping portions together, and opposing arms supporting said extendable means, said opposing arms extending in a generally horizontal plane and constructed to matably fit about a stringer between the deckboards; and holddown means for holding a pallet against said support member surface, said holddown means having a first portion superjacent said clamping portions of said frame for applying a vertical fore in the direction of said pallet support member, said holddown means being movably mounted to pivot about a vertical axis.

6. The apparatus in claim 5 wherein said holddown means further includes a second portion and means for pivotally mounting said second portion of said holddown means about said given axis.

7. The apparatus in claim 6 wherein said means for pivotally mounting said second portion includes first support means for supporting said holddown means independently of said plating means.

8. The apparatus in claim 7 wherein said means for pivotally mounting said frame includes second support means for supporting said frame and wherein said first and second support means are separatedly affixed to said pallet support member.

9. The apparatus in claim 5 wherein said frame is a unitary member having opposing arms joined at a bight portion and wherein said extendable means applies a force directly to said clamping means from said arms.

10. The apparatus in claim 9 wherein said given axis extends through said bight portion.

11. The apparatus in claim 5 wherein said given axis is vertically oriented.

12. A plating apparatus for constructing or repairing pallets having stringers and deckboards defining an enclosed closed space comprising:

a pallet support member having a generally horizontal surface for supporting a pallet;

plating means for forcing at least one splice-plate and a portion of a pallet supported on said support member surface together, said plating means having horizontally extending arms constructed to matably fit about a stringer between the deckboards;

holddown means for forcing the pallet against said support member, said holddown means being vertically adjustable;

first mounting means for mounting said plating means to said support member; and second mounting means for horizontally movably mounting said holddown means to said support member independently of said first mounting means.

13. The apparatus in claim 12 wherein said second mounting means pivotally mounts said holddown means to pivot with respect to said support member.

14. The apparatus in claim 12 wherein said first mounting means pivotally mounts said plating means to pivot with respect to said support member.

15. The apparatus in claim 14 wherein said second mounting means pivotally mounts said holddown means to pivot with respect to said support member.

16. The apparatus in claim 15 wherein said first and second mounting means mount said plating means and said holddown means to pivot about the same axis.

17. The apparatus in claim 16 wherein said axis is vertically oriented.

18. The apparatus in claim 12 wherein said support member includes a horizontal planar surface for supporting said pallet.

19. A plating apparatus for constructing or repairing pallets comprising:

a pallet support member including a horizontal support surface and a base for supporting said surface;

plating means including a unitary c-shaped frame having opposing arms and a bight portion between said arms, said plating means further including pressing means extending between said arms for forcing at least one splice-plate and a portion of a pallet together;

first mounting means for pivotally mounting said c-shaped frame to said base such that said frame will pivot in a plane generally parallel to said support surface;

a holddown member including force producing means and a second mounting means for pivotally mounting said force producing means generally perpendicular to said support surface adjacent said pressing means; and said second mounting means being connected with said base independent of said first mounting means, said second mounting means including a first horizontal member mounted to said base and extending away from said horizontal surface to another end, a vertical member extending upwardly from said outer end of said first horizontal member to an outer end of a second horizontal member extending toward said horizontal surface above said c-shaped member and a pivot member mounted to an inner end of said second horizontal member.

20. The apparatus in claim 19 wherein said first and second mounting means respectively mount said c-shaped frame and said force producing means to pivot about a common axis.

21. The apparatus in claim 19 wherein said first mounting means includes a pivot pin extending from the center of gravity of said c-shaped frame.

22. The apparatus in claim 21 wherein said first mounting means further includes a pair of vertically spaced apart bearing members mounted to said base for pivotally mounting said pin.

23. The apparatus in claim 19 wherein said force producing means includes a third horizontal member extending from said pivot means to a vertically oriented extendable cylinder.

24. A plating apparatus for constructing or repairing a pallet having stringers and deckboards defining an enclosed space comprising:
- a unitary c-shaped member having opposing arms extending in a generally horizontal plane and joined at a bight portion, said opposing arms being constructed to matably fit about a stringer between the deckboards;
- means for mounting said c-shaped member in a horizontal plane; and
- pressing means for extending between said arms for forcing at least one splice-plate and a portion of a pallet toward each other including a hydraulic cylinder actuated by a hydraulic pump having two modes of operation, one of said modes being low pressure and high volume and one of said modes being high pressure.

25. The apparatus in claim 24 further including support means for supporting a pallet below said c-shaped member and holddown means for forcing a portion of a pallet against said support means.

26. The apparatus in claim 24 wherein said pressing means further includes valve means between said pump and hydraulic cylinder for bypassing said pump in order to discharge hydraulic fluid from said hydraulic cylinder.

27. A plating apparatus for constructing or repairing pallets having stringers and deckboards defining a closed space comprising:
- a pallet support member for supporting a pallet;
- plating means for forcing at least one splice-plate and a portion of a pallet supported on said support member together, said plating means being constructed to matably fit about the stringers and between the deckboards;
- holddown means for forcing a pallet against said support member;
- first mounting means for mounting said plating means to said support member; and
- second mounting means for mounting said holddown means to said support member independently of said first mounting means, said second mounting means including a first horizontal member mounted to said base and extending away from said horizontal surface to an outer end, a vertical member extending upwardly from said outer end of said first horizontal member to an outer end of a second horizontal member extending toward said horizontal surface above said plating means and a pivot member mounted to an inner end of said second horizontal member.

28. The apparatus in claim 27 wherein said second mounting means includes a third horizontal member extending from said pivot member to said holddown means.

* * * * *

UNITED STATES PATENT AND TRADEMARK OFFICE
CERTIFICATE OF CORRECTION

PATENT NO. : 5,121,540

DATED : June 16, 1992

INVENTOR(S) : Gerald L. Dykstra

It is certified that error appears in the above-identified patent and that said Letters Patent is hereby corrected as shown below:

Column 3, line 43:
    After "resistance" (first occurrence)
    insert --.--.

Column 4, line 63, claim 1,
    "aid" should be --said--.

Column 5, line 36, claim 5,
    "vertical fore" should be
    --vertical force--.

Column 6, line 53, claim 19,
    "another end" should be
    --an outer end--.

Column 7, line 5, claim 23,
    "pivot means" should be
    --pivot member--.

Signed and Sealed this

Twenty-eighth Day of September, 1993

Attest:

BRUCE LEHMAN

*Attesting Officer*      *Commissioner of Patents and Trademarks*